United States Patent [19]

French et al.

[11] 4,207,283
[45] Jun. 10, 1980

[54] METHOD OF POST THICKENING ONE END SECTION OF A PLASTIC PIPE

[75] Inventors: David W. French, Littleton, Colo.; Richard C. Faber, Denison, Tex.; Wayne D. Weger, Colbert, Okla.

[73] Assignee: Johns-Manville Corporation, Denver, Colo.

[21] Appl. No.: 922,947

[22] Filed: Jul. 10, 1978

Related U.S. Application Data

[63] Continuation-in-part of Ser. No. 722,187, Sep. 17, 1976, abandoned.

[51] Int. Cl.$^2$ ............................................. C04B 35/60
[52] U.S. Cl. ...................................... 264/322; 264/327
[58] Field of Search ................. 264/297, 320, 322, 327

[56] References Cited

U.S. PATENT DOCUMENTS

| 3,843,300 | 10/1974 | McFarlane | 264/322 |
| 3,899,565 | 8/1975 | Putter | 264/322 |
| 3,923,952 | 12/1975 | La Branche | 264/322 |

Primary Examiner—Donald J. Arnold
Assistant Examiner—James R. Hall
Attorney, Agent, or Firm—Robert M. Krone; Joseph J. Kelly; Gregory W. O'Connor

[57] ABSTRACT

The wall of one end section of a plastic pipe is post thickened. As disclosed herein, this is accomplished by heating a predetermined length of the end of the pipe to its state of thermal deformability and thereafter causing the pipe to deform within and substantially fill a longitudinally extending, circumferential cavity which is thicker than the originally formed pipe wall. At the same time, a predetermined amount of heat is applied to the cavity from points along the length of and around the circumference of the inner and outer surfaces of the cavity. These points of heat extend from the back end of this cavity towards but stop short of its front end, a predetermined distance from the front end, thus defining a transition zone. This transition zone, among other things, prevents the remaining portion of the pipe from being heated and thus easily distorted during the thickening operation.

8 Claims, 3 Drawing Figures

METHOD OF POST THICKENING ONE END SECTION OF A PLASTIC PIPE

BACKGROUND OF THE INVENTION

This is a continuation-in-part of Ser. No. 722,187 filed Sept. 17, 1976, now abandoned.

The present invention relates generally to a method of post thickening the wall along one end section of a plastic pipe and more particularly to an improvement over the method and assembly disclosed in British Pat. No. 986,076 which issued to Baxter Laboratories Inc. and was published on Mar. 17, 1965.

In the Baxter Laboratories Patent just recited, a thermoplastic tube is disclosed as well as a method of an assembly for thickening the wall at one end of the tube. In accordance with the disclosure in this patent, the tube wall is thickened by utilizing an outer electrode in the form of a longitudinally extending cylindrical sleeve and an inner electrode in the form of a fixed mass located concentrically within the outer electrode or sleeve. This fixed mass, that is, the inner electrode, and the concentric sleeve, that is, the outer electrode, together define a circumferential cavity or what the patent refers to as a space which is opened at one end, its entry end, and closed at its opposite end. Each of the electrodes is connected to a high frequency generator and, in this regard, an insulating liner is provided between the two electrodes.

In operation, one end of the tube, specifically the end to be thickened, is positioned within the outer electrode, i.e., within the cavity or space defined by the inner electrode and the inner surface of the outer electrode. A high frequency voltage is passed between the electrodes and at the same time a force is exerted upon the tubing in the direction of the inner electrode. The flow of high frequency voltage is provided for softening the plastic tube and the application of force upon the tube is provided for causing the tube to deform within and fill the cavity or space, thereby providing a thicker wall section than the rest of the tube.

The overall disclosure in the British Patent just discussed appears to be directed primarily to the formation of a rounded open end on a thermoplastic tube and is specifically applicable to flexible vinyl. However, as discussed above, it should be clear that this disclosure does teach a particular way of post thickening the wall along one end section of the tube, specifically a thin walled small diameter tube such as a catheter or enema tube. While the method disclosed may or may not be satisfactory for thickening the wall of tubes of this type, Applicants have found improved ways to insure proper post thickening, especially where the wall section to be thickened is part of a larger diameter rigid polyvinyl chloride pipe.

SUMMARY OF THE INVENTION

Specifically, Applicants have found that the tube or pipe may inadvertently collapse or otherwise deform inwardly as a result of the post thickening process taught in the British Patent, particularly when the section to be thickened is relatively long compared to its wall thickness and overall diameter. More specifically, as disclosed in the British Patent, heat is applied to the entire portion of the tube within the cavity by means of the high frequency voltage. Some of this heat tends to migrate along the tube eventually reaching outside the cavity. As a result, when force is applied to the tube this heated section outside the tube if sufficiently hot will buckle or otherwise deform in an undesired manner. As will be discussed in more detail hereinafter, Applicants have found a way to overcome this, specifically by providing what may be referred to as a transition zone at and within the open end of the wall thickening cavity. The tube or pipe material located in this transition zone in the wall thickening cavity is not subjected to heat directly, that is, heat is not applied in the direct vicinity of this material at the adjacent side walls of the cavity along the transition zone. As a result, that portion of the plastic within this zone tends to be cooler than the plastic material located further within the cavity. This zone acts to prevent a sufficient amount of heat within the cavity and within the tube or pipe in the cavity from moving through the tube outside the cavity to cause the latter to buckle or otherwise deform just outside the wall thickening cavity.

An object of the present invention is to provide a method of post thickening the wall along one end section of a plastic pipe without causing the pipe to buckle or otherwise deform in an undesirable way.

Another object of the present invention is to provide this method in a way which does not damage the plastic material making up the pipe, specifically so that the plastic is not inadvertently deteriorated.

The specific assembly disclosed for performing this method includes means defining a longitudinally extending, circumferential cavity having an outer diameter approximately equal to the outer diameter of the pipe and an inner diameter approximately equal to the desired inner diameter of the end section to be thickened. This cavity is at least equal in length to the length of the end section and it has a closed back end and an open front or entry end. The assembly also includes heating means located at points along the length of and around the inner and outer circumference of the wall thickening cavity.

In accordance with one aspect of the present invention, these heating points, actually the heating means themselves, extend from the back end of the cavity towards but stop short of the cavity's front end, thereby defining what was previously referred to as a transition zone at the front end of the cavity. In accordance with another aspect of the present invention, the wall thickening cavity is actually longitudinally longer than the preheated end section of the plastic pipe to be thickened. By incorporating each of these aspects of the present invention, the possibility that the pipe will buckle or otherwise deform outside the wall thickening cavity during the wall thickening operation is minimized if not completely eliminated.

In operation, a predetermined length of one end of the plastic pipe, specifically at that end to be thickened, is heated to its state of thermal deformability. That is positioned with the aforedescribed cavity preferably so that its free end engages against the closed end of the cavity, hence assuring that the entire heated length is well within the cavity. By relative movement between the cavity and pipe, the pipe is forced to deform within and substantially fill the cavity, whereby to thicken the wall of the end section. At the same time, that is, as the pipe is forced to deform within and substantially fill the cavity, a predetermined amount of heat is applied to the cavity by the heating means discussed above. In a preferred embodiment, the entire cavity, with the exception of the transition zone, is heated to a temperature of not less than about 265° F. and not more than about 325° F.

DETAILED DESCRIPTION

Figure 1:
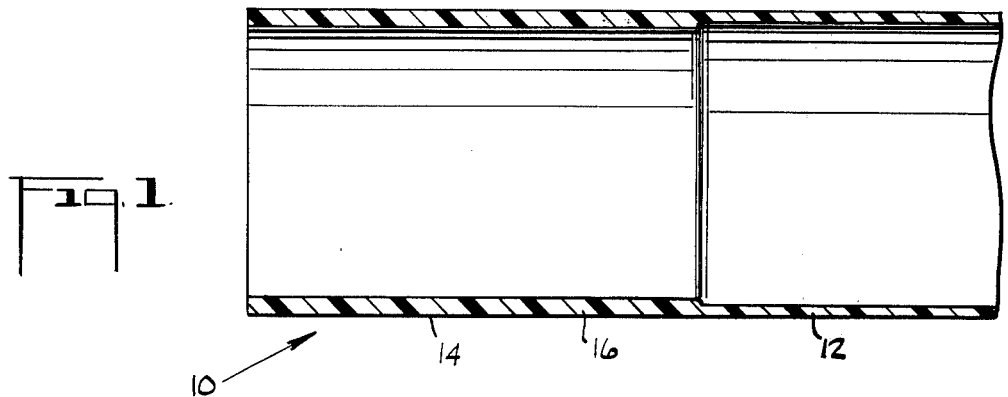
FIG. 1 is a longitudinal sectional view of a plastic pipe having one end section which has been post thickened in accordance with the present invention.

Turning to the drawing wherein like components are designated by like reference numerals throughout the three figures, attention is specifically directed to FIG. 1 which illustrates a pipe 10. This pipe is constructed of any thermoplastic material and polyvinyl chloride in a particular embodiment. It includes a non-thickened pipe wall 12 which extends along its entire length with the exception of an end section 14. This end section has a pipe wall 16 which has been post thickened in accordance with the present invention.

Figure 2:
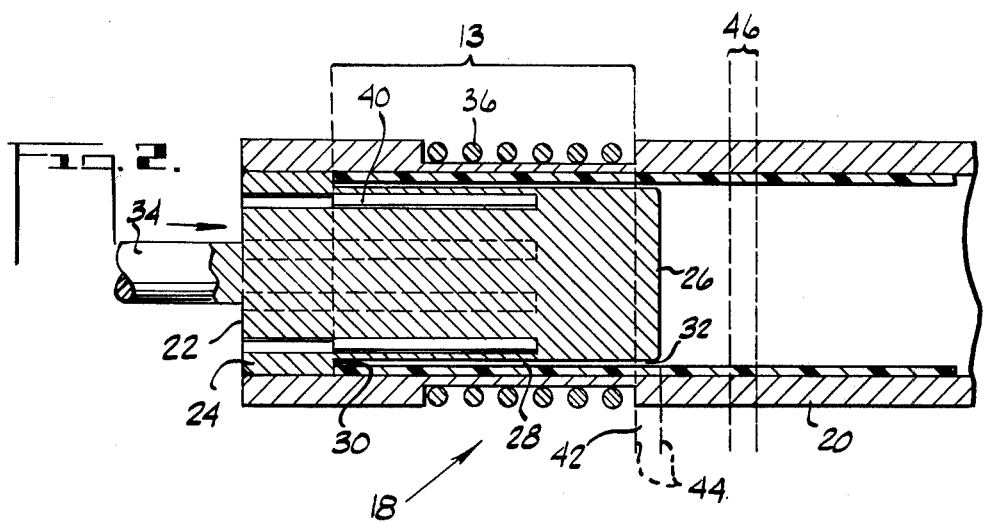
FIG. 2 is a cross-sectional view of an assembly which is provided for post thickening the wall along one end section of a plastic pipe, for example the plastic pipe illustrated in FIG. 1.
Figure 3:
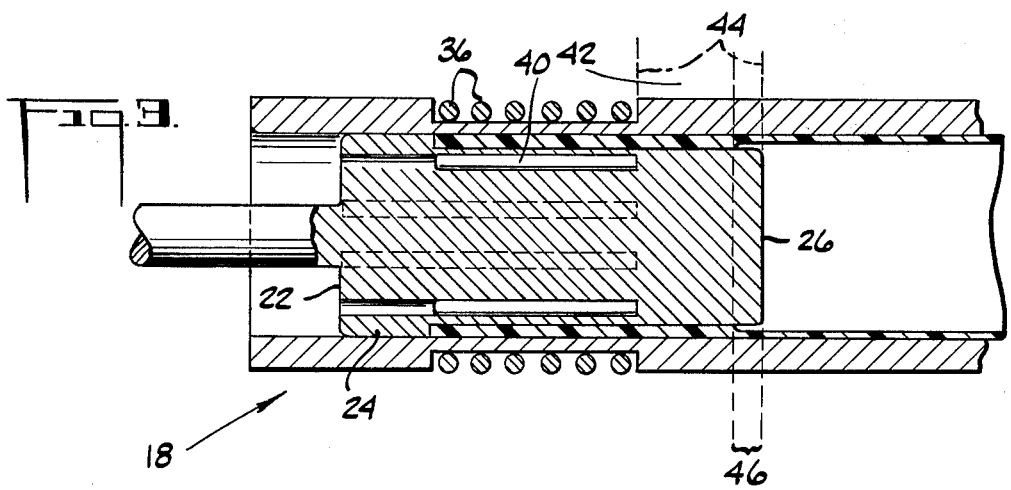
FIG. 3 is a cross-sectional view of the assembly of FIG. 2, shown in a different operating position.

Turning to FIGS. 2 and 3, an assembly for increasing the wall thickness of end section 14 is illustrated and generally designated by the reference numeral 18. This assembly includes a longitudinally extending cylindrical sleeve 20 constructed of any suitable material, for example steel. The sleeve has an inner diameter approximately equal to the outer diameter of pipe 10 and in a preferred embodiment of the present invention it is supported in a stationary or fixed position by suitable means (not shown).

The assembly also includes a longitudinally extending cylindrical ram 22 which is mounted concentrically within sleeve 20 and is slidably movable therein. This ram includes a rearward cylindrical section 24 which fits snugly but slidably within sleeve 20, that is, its outer diameter is just slightly less than the inner diameter of the sleeve. The ram also includes a front section 26 which extends forwardly from the front face of back section 24. The outer diameter of this front cylindrical section is substantially less than that of the back section and it is concentrically located within the sleeve 20.

As illustrated, front section 26 and the inner surface of sleeve 20 together define a longitudinally extending, circumferential cavity 28 having an outer diameter (the inner diameter of the sleeve) approximately equal to the outer diameter of pipe 10 and an inner diameter (the outer diameter of section 26) approximately equal to the desired inner diameter of end section 14 after the end section has been thickened. This cavity is at least equal in length to the length of end section 14 and in accordance with one feature of the present invention it is longitudinally longer than end section 14. As illustrated, the cavity is closed at its back end, indicated at 30, by means of the ram's back section 24 and is opened at its front end, as indicated at 32.

As stated above, ram 22 is slidably movable within sleeve 20. Assembly 18 includes conventional means for moving the ram. For example, the ram can be attached to the free end of a piston 34 which in turn could be part of a conventional pneumatically, hydraulically or electrically actuated piston arrangement. In any event, for reasons to be discussed hereinafter, the ram is moved by appropriate means between a first or rearward position as illustrated in FIG. 2 and a second or forward position as illustrated in FIG. 3. In either position, and in all intermediate positions therebetween, cavity 28 remains the same length as defined by the front section 26 and closed back portion 24 of ram 22.

As stated previously and as will be discussed in more detail hereinafter, cavity 28 is necessarily heated in order to post thicken end section 14 of pipe 10. Accordingly, assembly 18 includes heating elements 36 and 40. These heating elements may be of any suitable conventional type. As illustrated in both FIGS. 2 and 3, heating elements 36 are in the form of bands located around sleeve 20 in close proximity to the sleeve's inner surface. They could of course be located further within the sleeve wall or right at its inner surface so long as they heat cavity 28 in the way intended. These heating elements extend circumferentially around the inner surface of sleeve 20 and extend longitudinally a predetermined distance along the sleeve. The heating elements 40 are located within ram section 26 and together extend circumferentially around the ram section in close proximity to its outer surface. These heating elements can also be located further within the section 26 or at its surface so long as they heat cavity 28 in the way intended. Like heating elements 36, heating elements 40, which as illustrated are in the form of cartridges or plugs extend longitudinally a predetermined distance along the length of section 26, but stop well short of the front section 26 of ram 22.

Inasmuch as sleeve 20 is in a fixed position, heating elements 36 are also fixed. On the other hand, it should be readily apparent that heating elements 40 are movable with ram 22. More specifically, as ram 22 moves between its first or rearward position illustrated in FIG. 2 and its second or forward position as illustrated in FIG. 3, heating elements 40 move with it. However, as illustrated in both of these figures, heating elements 40 are always located rearwardly of what may be referred to as transition zone 42 located between dotted lines 44, regardless of the position of ram 22. Heating elements 36 are also located rearwardly of this zone. In fact, as illustrated in the figures, heating elements 36 are located just to the left or just rearwardly of the transition zone since the position of elements 36 define the rearwardmost boundary of the transition zone. The heating elements 40 are located rearwardly of heating elements 36 when the ram is in its first or rearward position, as seen in FIG. 2, and the heating elements are aligned with one another when the ram is in its second or forward position, as illustrated in FIG. 3.

It should be apparent from both FIGS. 2 and 3 that transition zone 42 continuously increases in length as ram 22 moves forward in sleeve 20. However, the transition zone does include a forward end portion of cavity 28 regardless of the position of ram 22. In other words, during the operation of ram 22, there is always some portion of cavity 28 which is located forward (to the right as shown in FIGS. 2 and 3) of both heating elements 36 and 40, and hence is not directly heated by these heating elements. The specific reason for utilizing this transition zone will be discussed below.

Having described assembly 18, attention is now directed to the manner in which it operates to form thickened section 14 of PVC pipe 10. In this regard, it should be noted that before the assembly is actually utilized to thicken end section 14 of pipe 10, a predetermined length of pipe 10, such as length 13, is initially heated to its state of thermal deformability. This is done by conventional means (not shown) in a conventional way and hence will not be discussed in detail herein. It suffices to state that the conventional means could possibly use the heating elements of assembly 18 or it can use separate heating elements. In addition, in a specific embodiment of the present invention with the plastic being polyvinyl chloride, the length 13 is heated to about 165° F. which allows it to reach its state of thermal deformability. With the length 13 in this state, it is positioned entirely within cavity 28, that is, so that its free end engages section 24 of ram 22, keeping in mind that the ram is in its rearward FIG. 2 position. At the same time, the heating elements 36 and 40 are on, that is, they are applying a predetermined amount of heat to cavity 28 and hence to length 13.

As stated above, one feature of the present invention resides in the utilization of a cavity which is longitudinally longer than the end section to be thickened. Hence, with thickened end section 14 positioned entirely within cavity 28, as shown in FIG. 3, a longitudinal portion of pipe 12 not thickened is also located in cavity 28. This portion is indicated at 46. In accordance with a second feature of the present invention, a transition zone, specifically transition zone 42, is utilized. As previously stated, this transition zone is different than the rest of cavity 28 in that it does not include heating elements. As can be seen from FIGS. 2 and 3, with both of these features combined, it should be apparent that a longitudinal portion of pipe 12, specifically portion 46, not to be thickened and not preheated is located within cavity 28, at least when ram 22 is in its second or FIG. 3 position. Moreover, this portion is located in transition zone 42. The specific advantages of this will be discussed hereinafter.

After having inserted preheated length 13 of pipe 10 (and a non-heated portion of pipe 10 if length 13 is shorter than cavity 28 as is illustrated in FIG. 2) into cavity 28, ram 22 is moved from its FIG. 2 position. The first portion of end section 14 to be formed results from the deformation of preheated length 13. The rest of the thickening operation proceeds more slowly since the remainder of the pipe 10 contained in cavity 28 is neither preheated nor is it heated directly by heating elements 36 and 40, since it is located in the transition zone 42. Rather, the heat needed to bring the thickening to the completed state shown in FIG. 3 is derived essentially entirely from heat migrating from the already thickened plastic contained in cavity 28. Note, however, that with ram 22 in its forwardmost or FIG. 3 position, an end portion of cavity 28, i.e. a portion in transition zone 42, is not filled. Rather pipe portion 46 remains undeformed. This is because portion 46 was neither preheated nor was it subjected to as much heat as was end section 14 because of its location within unheated transition zone 42 remote from preheated length 13. As a result, this portion of the pipe acts as a buffer or a barrier. It prevents heat from transferring to the remaining portion of the pipe outside the cavity in an amount sufficient to cause the pipe to buckle or otherwise wrinkle just outside the cavity. If this were not the case, that is, if the entire portion of pipe 12 located within cavity 28 were preheated and heated within the cavity, a sufficient amount of heat would quite possibly move through the pipe outside the cavity and cause buckling or wrinkling generally.

This operation of the transition zone 42 can best be seen when the thickening operation is broken down into two sequential but essentially uninterrupted steps. The first step comprises the rather rapid axial compression and concomitant thickening of preheated length 13. This occurs rather rapidly since the thermoplastic material is initially in a state of thermal deformability, and is maintained at this state by heating elements 36 and 40. The remaining portion of end section 14 yet to be thickened must depend to a major extent if not exclusively on heat migrating from the already thickened pipe to bring it to the proper temperature for themal deformation. Thus, this second deforming step inherently takes longer as the temperature gradient progresses forwardly (to the right as shown in FIGS. 2 and 3) in transition zone 42.

The exact length of cavity 28, its thickness and the amount of force and heat required to move the ram from its FIG. 2 to its FIG. 3 position and deform the plastic within cavity 28 and all of the other dimensions of assembly 18 will of course depend upon the particular material of the pipe being thickened, the dimensions of the pipe, the desired wall thickness of the end section to be thickened and the length of the end section. Where however the material is polyvinyl chloride, it has been found that that portion of cavity 28 between heating elements 36 and 40 should be heated to at least about 265° F. and not more than about 325° F. Where the temperature is below this lower value, it becomes difficult if not impossible to force the heated end section to deform and uniformly fill the cavity 28. Where the temperature is above the upper value, it is quite possible to burn or otherwise deteriorate the plastic.

By way of illustration, attention is now directed to an actual working embodiment of the present invention. In this embodiment, an end section of a 4-inch PVC pressure pipe, rated for 160 psi SDR 26 (Plastic Pipe Institute) service was thickened in accordance with the present invention. The length of this thickened section was 6 inches and the thickness of the wall before thickening was 0.173 inch whereas its thickness after thickening was 0.248 inch. The length of cavity 28 was 6½ inches and the movement of ram 24 between its rearward and forward position was approximately 1¼ inches. The temperature of cavity 28 was about 312° F. Approximately 6 inches of end section thickened was initially heated to approximately 165° F. In this regard, it should be noted that while 6 inches of the pipe were preheated and while the length of the thickened section was 6 inches they were not the same 6 inches. More specifically as the preheated section was deformed 1¼ inches inward, enough heat in the pipe moved inward the 1¼ inches lost by deformation to thicken that portion of the pipe. In this example, about one-half of the movement of the ram, or ⅝ inch, was accomplished almost immediately, or within the first 5 to 10 seconds of the thickening operation. The rate at which this portion of the ram movement takes place is limited primarily only by the speed at which the hydraulic ram or the other prime mover can traverse the specified distance, since the portion of the pipe thickened during this stage is already in an extremely plastic condition. The remaining movement of the ram however, takes about 75 to 90 seconds to complete. This time is needed in order for the heat contained in the preheated (and now thickened) section of the pipe to migrate into the transition zone in the mold cavity and soften the pipe contained therein to the required degree of plasticity. Were there not a transition zone, this heat would most likely move outside cavity 28 and quite possibly cause the pipe to buckle. The samples made in accordance with the present invention did not buckle or otherwise deform just outside the entry end of cavity 28. However, those samples which were made without a transition zone in the cavity or without an unheated buffer portion did deform at the mouth of the cavity.

It is to be understood that the foregoing example is for illustrative purposes only and is not intended to limit the present invention. It is also to be understood that the present invention is not limited to the movement of ram 22 relative to sleeve 20 and pipe 10. It is possible to maintain the ram and sleeve fixed and move pipe 10. However, this is not only impractical because of the length of the pipe but also because there is the possibility that the pipe may buckle along its length as a result of it being actually moved into the cavity. In a preferred embodiment, only the ram moves as described or both the ram and sleeve move together while the pipe remains fixed. In this latter case, the moving ram and sleeve would be fixed relative to one another as in FIG. 3. This has the advantage of having the heating elements 36 and 40 aligned with one another at all times. Of course, suitable means could be provided for moving both the ram and sleeve in synchronism.

What is claimed is:

1. A method of forming an end section on a plastic pipe by thickening the pipe wall of said end section, said method comprising:
    (a) heating a predetermined length of said pipe to its state of thermal deformability;
    (b) providing a longitudinally extending circumferential cavity having an outer diameter approximately equal to the outer diameter of said pipe, and an inner diameter approximately equal to the desired inner diameter of said end section after thickening thereof, said cavity being at least equal in length to the length of said end section and having a closed back and an open front end;
    (c) positioning said predetermined length of said pipe entirely within said cavity such that a remainder of said plastic pipe extends from said front end of said cavity;
    (d) moving said cavity and said pipe relative to one another and thereby forcing at least said predetermined length of said pipe to deform within and partially fill said cavity so as to thicken the wall of said at least said predetermined length of pipe as said predetermined length of pipe is forced to deform within said cavity;
    (e) applying a predetermined amount of heat to said cavity from points along the length of and circumferentially around the inner and outer surfaces thereof, said points extending from the back end of said cavity towards, but stopping short of, a predetermined distance from said front end so as to define a transition zone;
    (f) allowing heat to migrate from the then deforming said predetermined length of pipe into the pipe positioned in said transition zone; and
    (g) continuing to move said cavity relative to said pipe, thereby forcing said pipe positioned in said transition zone to deform and substantially fill said cavity.

2. A method according to claim 1 wherein said cavity provided in step (b) is longitudinally longer than said predetermined length of pipe.

3. A method according to claim 2 wherein said plastic is polyvinyl chloride and wherein said cavity is heated to a temperature of between approximately 265° F. and 325° F. along the length of said cavity adjacent said heating points.

4. A method as set forth in claim 1 wherein the steps (f) and (g) are continued to the extent that a portion of said pipe in said transition zone which is not thickened is heated only to the extent that it acts as a buffer for the length of pipe extending from said front end, thereby preventing distortion of said remainder of said pipe.

5. A method of thickening the wall along one end section of a plastic pipe, said method comprising:
    (a) heating an end of said pipe along a predetermined length to its state of thermal deformability;
    (b) providing a longitudinally extending cylindrical sleeve having an inner diameter approximately equal to the outer diameter of said pipe and a longitudinally extending cylindrical ram mounted concentrically within said sleeve, said ram including an end portion which together with the inner surface of the sleeve defines a longitudinally extending, circumferential cavity having an outer diameter approximately equal to the outer diameter of said pipe and an inner diameter approximately equal to the inner diameter of said end section after thickening thereof, said cavity being longitudinally longer than said end section and having a closed back and an open front end;
    (c) positioning said predetermined length of pipe entirely within said cavity so that the free end of said predetermined length engages the closed back of said cavity;
    (d) forcing said ram a predetermined distance in the direction of said front end to cause said predetermined length of pipe and at least a portion of the rest of said pipe in said cavity to deform within and substantially fill said cavity whereby to thicken the wall of said end section; and
    (e) as said ram is forced in the direction of said front end, applying a predetermined amount of heat to said cavity from points along the length of and circumferentially around the inner diameter and the outer diameter of said cavity, said points extending from the back end of said cavity towards but stopping short of a predetermined distance from said front end, so as to define a transition zone, said portion of said remainder of said pipe being substantially entirely contained within said transition zone.

6. A method according to claim 5 wherein said plastic is polyvinyl chloride and wherein said cavity is heated to a temperature of between approximately 265° and 325° F. along the length of said cavity adjacent said heating points.

7. A method according to claim 5 wherein said sleeve is fixed and said ram is slidably mounted therein and wherein said ram, as it is forced in the direction of said pipe, slides within said sleeve.

8. A method according to claim 5 wherein said sleeve is forced said predetermined distance in the direction of said pipe in synchronism with said ram whereby to aid said ram in causing said pipe to deform within and substantially fill said cavity.

* * * * *